(12) United States Patent
Goodreau et al.

(10) Patent No.: US 6,899,770 B1
(45) Date of Patent: May 31, 2005

(54) COMPOSITION AND PROCESS FOR TREATING METAL SURFACES

(75) Inventors: Bruce H. Goodreau, Romeo, MI (US); Robert W. Miller, Oakland, MI (US); Thomas J. Prescott, Troy, MI (US); Christopher A. Engel, Farmington, MI (US); Michael A. Murphy, Armada, MI (US); James P. Bershas, West Bloomfield, MI (US); John R. Pierce, Huntington Woods, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/914,056

(22) PCT Filed: Mar. 3, 2000

(86) PCT No.: PCT/US00/05766

§ 371 (c)(1),
(2), (4) Date: Jan. 14, 2002

(87) PCT Pub. No.: WO00/52226

PCT Pub. Date: Sep. 8, 2000

Related U.S. Application Data

(60) Provisional application No. 60/158,171, filed on Oct. 7, 1999, provisional application No. 60/147,932, filed on Aug. 9, 1999, and provisional application No. 60/122,810, filed on Mar. 4, 1999.

(51) Int. Cl.[7] .................................................. C23C 22/00
(52) U.S. Cl. ........................ 148/246; 148/254; 148/264
(58) Field of Search ................................. 148/246, 257, 148/264

(56) References Cited

U.S. PATENT DOCUMENTS

| | | | |
|---|---|---|---|
| 3,250,103 A | 5/1966 | Beaubien et al. ............... 72/42 |
| 3,287,264 A | 11/1966 | Topper ......................... 252/28 |
| 3,505,128 A | 4/1970 | Fujii et al. .................... 148/6.2 |
| 3,795,546 A | 3/1974 | Hall et al. .................... 148/6.2 |
| 3,899,625 A | 8/1975 | Izumi et al. ................. 428/457 |
| 4,032,675 A | 6/1977 | Irie et al. ..................... 427/126 |
| 4,088,621 A | 5/1978 | Miller ...................... 260/29.6 S |
| 4,138,276 A | 2/1979 | Miller .......................... 148/6.2 |
| 4,170,671 A | 10/1979 | Hirasawa et al. ......... 427/388 C |
| 4,297,317 A | 10/1981 | Vogt et al. ..................... 422/16 |
| 4,329,250 A | 5/1982 | Vogt et al. ............... 252/389 R |
| 4,411,145 A | 10/1983 | Lewis et al. ................... 72/42 |
| 4,474,669 A | 10/1984 | Lewis et al. ................... 252/23 |
| 4,475,957 A | 10/1984 | Sander ....................... 148/6.16 |
| 4,548,868 A | 10/1985 | Yonezawa et al. ........... 428/446 |
| 4,637,840 A | 1/1987 | Jujii et al. .................... 148/6.2 |
| 4,942,193 A | 7/1990 | Van Buskirk et al. ....... 524/276 |
| 5,321,061 A | 6/1994 | Anderson |
| 5,378,291 A | 1/1995 | Ara et al. .................... 148/251 |
| 5,432,211 A | 7/1995 | Morita et al. ................ 523/435 |
| 5,442,005 A | 8/1995 | Brugarolas et al. ......... 524/276 |
| 5,456,953 A | 10/1995 | Gosselin et al. ............ 427/522 |
| 5,624,978 A | 4/1997 | Soltwedel et al. .......... 523/402 |
| 5,859,095 A | 1/1999 | Moyle et al. |
| 6,034,041 A | 3/2000 | Nittel et al. ................. 508/474 |

FOREIGN PATENT DOCUMENTS

| | | |
|---|---|---|
| EP | 0219976 | 4/1987 |
| EP | 0251192 | 1/1988 |
| EP | 0363824 | 4/1990 |
| JP | 07 040501 | 2/1995 |
| WO | WO 2079249 | 5/1992 |
| WO | WO 00 35595 | 6/2000 |

OTHER PUBLICATIONS

JP 07040501 abstract.

*Primary Examiner*—Andrew L. Oltmans
(74) *Attorney, Agent, or Firm*—Stephen D. Harper; Mary K. Cameron

(57) ABSTRACT

A metal substrate is provided with a coating that (i) provides substantial corrosion resistance, (ii) makes it possible to shape the substrate by roll forming and similar light cold forming operations without the need for any oil or wax lubricant, and (iii) has good adhesion to subsequently applied paint. This is achieved by coating the metal substrate surface with an aqueous liquid composition that contains acrylate polymer resin, wax, and hexavalent chromium and then drying this coating into place on the surface to produce the desired dry coating.

24 Claims, No Drawings

COMPOSITION AND PROCESS FOR TREATING METAL SURFACES

RELATED APPLICATION

This application is a 35 USC 371 (c) application of PCT/US00/05755 filed Mar. 3, 2000 which claims priority from Provisional Applications U.S. Ser. Nos. 60/122,810 filed Mar. 4, 1999, 60/158,171 filed Oct. 7, 1999 and 60/147,932 filed Aug. 9, 1999, the entire contents of each application is incorporated herein by reference.

BACKGROUND OF THE INVENTION

This invention relates to treatment of a metal surface with an aqueous liquid composition that, before and/or during drying of the liquid composition into place on the surface, spontaneously reacts with the metal surface, without any application of electromotive force from an external source, to produce on the metal a surface with better corrosion resistance than the original untreated metal surface. More particularly, this invention is related to a process that provides a corrosion protective treatment that also provides lubricating qualities, so that mechanical deformation of the surface can be more readily accomplished, without unacceptable damage to the surface, than can the same mechanical deformation of the original untreated metal surface. Still more particularly, the metal surface treated is an alloy of zinc and aluminum, and/or the lubricating quality of the surface is sufficiently good that a metal sheet or coil having at least one surface modified by the treatment can be roll formed and/or press molded without unacceptable surface damage and without the use of any additional lubricant material on the part of the treated metal surface that is being mechanically deformed.

Aluminum-zinc alloy coated steel sheets are steel sheets which have been coated with an alloy which consists of 4–75% by weight of aluminum, the remainder being mainly zinc with traces of other components such as silicon, magnesium, cerium, lanthanum, or the like. At the +present time at least two such types of sheet steel are being manufactured: low aluminum-zinc alloy coated steel sheets, which are coated with an alloy consisting of 4–10% by weight of aluminum, the remainder consisting mainly of zinc with traces of magnesium, cerium, and/or lanthanum, and high aluminum-zinc alloy coated steel sheets, which are coated with an alloy consisting of 55% by weight of aluminum, 43.4% by weight of zinc, and 1.6% by weight of silicon. If the thickness of the coated layer on these sheets is the same as that on otherwise similar hot-dip galvanized steel sheets, the corrosion resistance is improved by a factor of some 1.5–2 times in the case of the low aluminum-zinc coated steel sheets and by a factor of some 3–6 times in the case of the high aluminum-zinc alloy coated steel sheets. Furthermore the high aluminum-zinc alloy coated steel sheets also have heat reflecting properties and excellent resistance to heat. As a result of their excellent properties, these aluminum-zinc alloy coated steel sheets have found wide application as building materials in the form of roofing and walling materials, in civil engineering applications, e.g., as guard rails, sound insulating barriers, anti-snow fencing, or drainage gullies, as materials for automobiles, domestic appliances, and industrial machinery and, after having been painted, as replacements for painted steel sheets.

However, the coated layer on these aluminum-zinc alloy coated steel sheets provides less effective lubrication than does the substantially pure zinc such as is found on the surface of hot-dip galvanized steel when roll forming or press molding these materials. The surface of aluminum-zinc alloy is more susceptible to damage; the coated layer may become fused onto the forming rolls or the pressing dies as a result of the heat which is generated by friction during such operations; and metal powder which has become detached from the aluminum-zinc alloy coated sheet steel may become attached to the forming rolls or the pressing dies. This powder may accumulate in the corner parts of a molded product, or it may cause defects that blemish the external appearance of the product.

In the past these problems have been overcome by coating the surface of the aluminum-zinc coated sheet steel with a lubricant such as oil or wax when carrying out shaping operations, in order to provide adequate lubrication at the surface of the aluminum-zinc alloy coated steel sheet. However, when such lubricating oils or waxes are used, there are disadvantages in subsequent processing and/or use. For example: the surface may be so slippery that an initially cylindrical coil of the finished material can readily be distorted by the force of gravity into a cone shape unless it is maintained strictly horizontal at all times when not mechanically restrained from such shape deformation; anything placed on an inclined surface of the coated lubricated material can more readily slip off than if the oil or wax were not present; and, if a coating is to be applied to the aluminum-zinc coated steel sheet after the shaping process, it is usually essential that all of the lubricating oil should be cleaned from the surface before applying any subsequent coating. Removing a lubricating oil or wax from the surface to a sufficient degree to assure uniformly good adhesion of the coating applied over it often is very difficult. Furthermore, when aluminum-zinc alloy coated steel sheet is shaped using a lubricating oil in the way described above, the lubricating oil becomes attached to the forming rolls or the pressing dies and if, at a later time, surface coated steel sheet is shaped using these same forming rolls or pressing dies, the lubricating oil often is transferred to the coated surfaces of these coated steel sheets, which are thereby stained. Any metal powder which is produced during the shaping process can become attached to the coated surface by way of the lubricating oil, so that it is necessary to clean the forming rolls or pressing dies thoroughly before carrying out such operations in order to prevent the occurrence of this type of contamination; such cleaning is very troublesome.

Additionally, the surfaces of aluminum-zinc alloy coated steel sheets are often subjected to a chromate treatment in order to prevent the formation of rust while the material is being stored. However if the aluminum-zinc alloy coated steel sheets have been treated with a water soluble lubricating oil, chromating treatment can lead to problems with pollution due to the dissolution of the chromate later.

U.S. Pat. No. 4,637,840 is believed to be the closest prior art. This teaches that a treatment composition consisting of water, hexavalent chromium, and a water soluble or water dispersible resin provides an external surface that does not need lubricating oil or wax. However, it has recently been found that the treatments provided according to the teachings of that patent are not always adequate to avoid a need for the use of lubricating oil to avoid surface damage during press and roll forming under current operating conditions. Accordingly, a major object of this invention is to provide a surface layer on metal substrates, particularly those of aluminum-zinc alloy, that will more reliably permit press and/or roll forming without the need for additional lubrication with materials that (i) diminish the adhesion or blemish the surface appearance of a subsequently applied coating and/or (ii) make the surface so slippery as to cause substantial practical difficulties in further processing or use of the metal with a surface treatment formed according to this invention. Other alternative and/or concurrent objects will be apparent from the description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not necessarily preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; and the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.

BRIEF SUMMARY OF THE INVENTION

It has been found that at least the major object of the invention as stated above can be achieved by treatment with an aqueous liquid composition that comprises, preferably consists essentially of, or more preferably consists of, water and the following components:
(A) dissolved, dispersed, or both dissolved and dispersed organic film-forming resin;
(B) dissolved, dispersed, or both dissolved and dispersed wax that is not part of immediately previously recited component (A); and
(C) dissolved, dispersed, or both dissolved and dispersed hexavalent chromium; and, optionally, one or more of the following components:
(D) dissolved, dispersed, or both dissolved and dispersed pH adjusting agent that is not part of any one of immediately previously recited components (A) through (C);
(E) dissolved, dispersed, or both dissolved and dispersed surfactant that is not part of any of immediately previously recited components (A) through (D);
(F) dissolved, dispersed, or both dissolved and dispersed trivalent chromium;
(G) dissolved organic solvent that is not part of any of immediately previously recited components (A) through (F);
(H) dissolved, dispersed, or both dissolved and dispersed material selected from the group consisting of (i) reducing agents that are capable, at a specified temperature, of reducing hexavalent chromium in the composition to trivalent chromium and (ii) oxidation products from a reducing agent that has reduced some initially hexavalent chromium in the composition to trivalent chromium, said dissolved, dispersed, or both dissolved and dispersed material not being part of any of immediately previously recited components (A) through (G);
(J) dispersed filler solid powder that is not part of any of immediately previously recited components (A) through (H); and
(K) colorant that is not part of any of immediately previously recited components (A) through (J).

For the purposes of this description:
a "dissolved, dispersed, or both dissolved and dispersed film-forming resin" means a material that satisfies the following condition: when:
  (i) the resin is dissolved, dispersed, or both dissolved and dispersed in an aqueous medium to form a liquid solution/dispersion that contains at least 20% of the film-forming resin,
  (ii) said solution/dispersion is formed into a liquid film at least 2 millimeters in thickness, and
  (iii) said liquid film is dried at at least one temperature that is at least 40° C., the resin forms a cohesive continuous solid body at the temperature of drying after drying is complete; and
"wax" is defined as a substance that: (i) is a plastic solid at 25° C. under normal atmospheric pressure and (ii) melts in contact with the natural ambient atmosphere without visually evident decomposition at a temperature that is at least 55° C.

DETAILED DESCRIPTION OF THE INVENTION AND ITS PREFERRED EMBODIMENTS

Component (A) preferably is selected from resins that, after drying from any solution/dispersion in which they may initially be present, are not soluble in water at 25° C. to an extent greater than, with increasing preference in the order given, 1.0, 0.5, 0.20, 0.10, 0.050, 0.020, 0.010, 0.0050, 0.0020, 0.0010, 0.00050, 0.00020, or 0.00010% of the resin in water.

Independently, component (A) preferably is selected from polymers of vinyl monomers selected from the group consisting of hydrocarbons, halohydrocarbons, acrylic acid, methacrylic acid, maleic acid, and all esters, amides, and nitriles of organic acids. (Whether before or after polymerization, salts of any of these acids are to be understood as equivalent to the acids themselves.) If these polymers, as is usually preferred, have as low a solubility in water before drying as they are preferred to have after drying, the resins will be predominantly dispersed rather than dissolved in the treatment composition. In such dispersions, a surfactant is normally required as a dispersing agent. The surfactants commonly used for this purpose in some (but not all) commercially supplied latexes, the preferred source for component (A), have not been observed to have any harmful effect on the properties of the compositions prepared with latexes containing them and if present are part of optional component (E) as described above, unless they are copolymerized into the polymer resin itself, in which instance they are part of component (A).

More preferably, component (A) is selected from polymers of monomers selected from the group consisting of acrylic acid, methacrylic acid, maleic acid, the esters of all of these acids, acrylonitrile, methacrylonitrile, acrylamide, and methacrylamide and still more preferably, in such polymers, the total number of millimoles of carboxylic acid and carboxylate salt moieties per gram of the dried resin is at least, with increasing preference in the order given, 0.030, 0.040, 0.050, 0.070, 0.080, 0.090, 0.100, 0.110, 0.120, 0.130, 0.135, or 0.140 and independently preferably is not more than, with increasing preference in the order given, 1.5, 1.0, 0.50, 0.40, 0.35, 0.30, 0.27, 0.24, 0.22, 0.200, 0.190, 0.180, 0.170, or 0.160.

Independently of other preferences, polymers of component (A) preferably have a glass transition temperature that is not more than, with increasing preference in the order given, 30, 27, 25, 23, 21, 19, 17, or 15° C.

Chemically, a wax to be used as component (B) in a composition or process according to this invention preferably is predominantly an organic substance selected from the group consisting of hydrocarbons, halohydrocarbons, halocarbons, alcohols, ethers, carboxylic acids, esters of carboxylic acids, ketones, and aldehydes. More preferably, the wax is polyethylene. Most if not all of the preferred waxes have scant solubility in water, and therefore are preferably added as dispersions to a mixture that constitutes, or after further additions will constitute, a composition according to the invention. Commercially available dispersions with fine dispersed particle size are preferably used. More particularly, the average particle size of a dispersion of wax that is part of component (B) in a composition according to the invention preferably is not more than, with increasing preference in the order given, 50, 40, 30, 20, 10, 5, 2, 1.0, 0.5, 0.20, 0.15, 0.12, 0.10, 0.08, or 0.06 micrometres. As with the acrylate polymers used in the same compositions, there is usually a dispersing agent required for a stable dispersion of this type; the dispersing agents in some but not all commercially supplied dispersions do not have any detrimental effect on a composition or process according to the invention; and when a dispersing agent for the wax component in a composition used according to the invention is present, this dispersing agent usually forms part of optional component (E).

Independently of its chemical nature, the melting point of a wax used in this invention preferably is at least, with increasing preference in the order given, 57, 65, 75, 85, 95, 105, 110, 115, 120, 125, or 129° C. and independently preferably is not more than, with increasing preference in the order given, 200, 180, 170, 160, 155, 150, 145, 140, 135, or 131° C.

A substantial amount of wax component (B) is required to obtain the maximum resistance to damage in forming the finished product, but too large a fraction of wax can be disadvantageous. For example, too much wax may: reduce the corrosion resistance, if the wax by itself does not form a continuous protective coating as the acrylic component (A) does; make a substrate surface so slippery that it is very difficult to keep it coiled and/or to keep anything placed on an inclined surface of the coated substrate from sliding off; and/or cause undesired adhesion of the coated surface to another surface with which it is in contact, especially if the wax is low in melting point and the coated surface is exposed to heat while or shortly before it is in contact with another surface from which it is desired later to separate it. Specifically, the ratio by mass, on a dried basis, of wax component (B) to acrylate component (A) preferably is at least, with increasing preference in the order given, 0.020:1.00, 0.040:1.00, 0.050:1.00, 0.060:1.00, 0.065:1.00, 0.070:1.00, 0.075:1.00, 0.080:1.00, 0.085:1.00, 0.090:1.00, 0.095:1.00, 0.100:1.00 or 0.103:1.00 and independently preferably is not more than, with increasing preference in the order given, 0.50:1.00, 0.40:1.00, 0.30:1.00, 0.25:1.00, 0.20:1.00, 0.15:1.00, 0.13:1.00, or 0.11:1.00.

Any water soluble source of hexavalent chromium atoms may be used to provide necessary component (C) according to the invention. Examples include chromic acid (i.e., $CrO_3$), ammonium bichromate, potassium bichromate, sodium bichromate, ammonium chromate, potassium chromate, sodium chromate, and the like. The use of ammonium salts and/or chromic acid is preferred, in order to avoid the presence in a composition according to the invention of any non-volatile alkali component. Inasmuch as the pH value preferred for a working composition according to the invention is at least slightly alkaline, ammonium salts are preferred for at least part of component (C), but they are, at least for economy, preferably formed in situ by adding aqueous ammonia to an aqueous solution of chromic acid. Accordingly, the concentration of chromium in a composition according to the invention is usually measured as its stoichiometric equivalent as $CrO_3$, and this stoichiometric equivalent preferably has a ratio to the concentration of component (A) (on a dry basis) in the same composition that is at least, with increasing preference in the order given, 0.0010:1.00, 0.0020:1.00, 0.0050:1.00, 0.0075:1.00, 0.0100:1.00, 0.0110:1.00, 0.0120:1.00, 0.0130:1.00, 0.0135:1.00, 0.0140:1.00, 0.0145:1.00, 0.0150:1.00, 0.0155:1.00, 0.0158:1.00, or 0.0162:1.00 and independently preferably is not more than, with increasing preference in the order given, 0.50:1.00, 0.20:1.00, 0.10:1.00, 0.050:1.00, 0.040:1.00, 0.030:1.00, 0.025:1.00, 0.021:1.00, or 0.017:1.00. If the hexavalent chromium-containing material is too low in ratio to acrylate, the treated material usually has inadequate corrosion resistance and is often subject to blackening, while if the ratio of hexavalent chromium to acrylate is too large, the treatment composition may become unstable, will definitely generate higher pollution and/or pollution abatement costs if used in the large majority of jurisdictions where chromium is considered polluting, and will decrease the likelihood of achieving a transparent coating as is usually desired.

A working treatment composition according to the invention preferably has a pH value that is at least, with increasing preference in the order given, 3.0, 4.0, 5.0, 5.5, 6.0, 6.5, 7.0, or 7.5 and independently preferably is not more than, with increasing preference in the order given, 11, 10.5, 10.0, 9.6, 9.2, 9.0, 8.8, 8.6, or 8.4. If the pH is too high or too low, the composition is likely to be unstable, because of precipitation and/or coagulation of at least part of its constituents. If most or all of the chromium present has been added as $CrO_3$ and there is no other alkaline constituent in the composition, an alkalinizing agent will usually be required as optional component (D) in order to achieve a pH value of 8.4 or more when that is desired. Any alkaline material may be used, but volatile ones such as ammonia and amines, for example, monoethylamine, diethylamine, triethylamine, and the like, and alkanolamines such as monoethanolamine, diethanolamine, and triethanolamine are preferred. At least for economy, simple ammonia, usually added as a concentrated solution in water, is most preferred.

As already noted above, some surfactant, part of optional component (E), is often needed to disperse any insufficiently water-soluble constituents of components (A) and (B). If the substrate to be treated is exceptionally difficult to wet uniformly and/or if the composition according to the invention contains preferred amounts of component (G) added to reduce the likelihood of cracks in the coating formed, additional surfactant may be needed to assure adequately uniform wetting. In such an instance, a fluorinated surfactant, more preferably a fluorinated anionic surfactant, most preferably a fluorinated alkyl carboxylate salt surfactant in which at least 80% of the carboxylate groups have at least 8 carbon atoms, is preferred. Independently, the concentration of fluorinated surfactant in a working composition according to the invention preferably is at least, with increasing preference in the order given, 0.0010, 0.0020, 0.0030, 0.0040, 0.0050, 0.0060, or 0.0070% of the total composition and independently preferably is not more than, with increasing preference in the order given, 0.080, 0.060, 0.050, 0.040, 0.030, 0.020, 0.015, 0.010, 0.0090, or 0.0080% of the total composition. A surfactant may also be needed in some instances for abatement of foaming, particularly if preferred amounts and types of component (G) as described below are present in the working composition. If foam is a problem with a composition according to the invention that does not contain an antifoam agent, there should be present in the composition according to the invention an amount of antifoam agent corresponding to a concentration that is at least, with increasing preference in the order given, 0.0020, 0.0040, 0.0050, 0.0060, 0.0070, 0.0080, 0.0090, 0.0100, 0.0110, 0.0120, 0.0130, or 0.0140% of the total composition and independently preferably is not more than, with increasing preference in the order given, 0.100, 0.080, 0.060, 0.050, 0.040, 0.030, 0.025, 0.020, 0.018, or 0.016% of the total composition. Independently of its concentration, any antifoam agent used preferably is a non-ionic surfactant and more preferably is selected from the group consisting of poly(oxyalkylene) polymers, ethoxylates of organic substances containing at least one phenol moiety per molecule, and organosiloxane polymers.

Even if surfactant is not needed for any of the purposes noted in the immediately preceding paragaph, its presence in a composition according to the invention may be preferred to reduce spontaneous, at least temporary adhesion between a surface treated according to the invention and another surface, optionally also treated according to the invention, which contacts the surface treated according to the invention. (This phenomenon, often called "blocking", is particularly troublesome when surfaces treated according to the invention are wound into a coil that is later unwound before use. The compression inherent in winding favors at least temporary adhesion between the surfaces. If such adhesion occurs, unwinding can cause transfer of coating from one portion of the treated surface to some other surface, thereby producing unsatisfactory coating uniformity. Even if such transfer does not occur, "stick-slip" behavior of the coil can occur, resulting in uneven tensions in various parts of the coil processing line and consequent potential coil treatment and/or coil usage irregularities that are undesirable.) It has been found that blocking can be prevented by including in a composition according to the invention at least one of the following types of surfactants:

a silicone and/or ethoxylated silicone polymer in an amount having a ratio to the total solids content of the composition that is at least, with increasing preference in the order given, 0.0010:1.00, 0.0020:1.00, 0.0030:1.00, 0.0040:1.00, 0.0050:1.00, 0.0080:1.00, 0.010:1.00, 0.015:1.00, 0.020:1.00, 0.023:1.00, or 0.025:1.0 and independently, at least for economy, preferably is not more than, with increasing preference in the order given, 1.0:1.00, 0.80:1.00, 0.60:1.00, 0.50:1.00, 0.45:1.00, 0.40:1.00, 0.35:1.00, 0.30:1.00, 0.25:1.00, 0.20:1.00, 0.15:1.00, 0.12:1.00, 0.10:1.00, or 0.075:1.00; and a fluorinated organic surfactant, preferably an anionic surfactant, in an amount having a ratio to the total solids content of the composition that is at least, with increasing preference in the order given, 0.0002:1.00, 0.0004:1.00, 0.0006:1.00, 0.0008:1.00, 0.0010:1.00, 0.0012:1.00, 0.0014:1.00, or 0.0016:1.0 and independently, at least for economy, preferably is not more than, with increasing preference in the order given, 0.010:1.00, 0.0075:1.00, 0.0050:1.00, 0.0040:1.00, 0.0030:1.00, or 0.0025:1.00. The fluorinated surfactants have the property that they do not substantially reduce the static frictional properties of the surfaces coated according to the invention, so that the undesired "telescoping" of a coil of substrate treated according to the invention is less likely to occur. Silicone polymers are more consistent in preventing blocking but do cause reduced static frictional properties of the surfaces coated with them. A choice between these two types of blocking prevention may be made on this basis.

Optional component (G) of organic solvent may not be needed and when not needed is preferably omitted for economy and avoidance of pollution problems and/or pollution abatement expense. There are at least three reasons, however, why organic solvents may be needed in a composition according to this invention in some instances. First, desired constituents of components (A) and/or (B) may require the presence of organic solvent as an aid in practical preparation of a composition according to the invention. In any such instance, the amount of organic solvent added for this purpose is preferably kept to the minimum required. Secondly, an organic solvent may be useful in removing contaminants from the substrate simultaneously with forming the desired protective coating according to the invention, but ordinarily better results will be achieved if the substrate is conventionally cleaned before any contact with a composition according to this invention. Thirdly and most frequently, component (G) may be needed to avoid cracking of the coating formed in a process according to the invention. Component (G) is unlikely to be needed for this reason if the glass transition temperature of component (A) is not more than 17° C. and is likely to be needed if the glass transition temperature of component (A) is more than 30° C.

When component (G) is included in a composition according to the invention in order to avoid cracking of the coating formed, this component is preferably selected from the group consisting of:

esters with a structure that can be made by completely esterifying orthophosphoric acid or sulfuric acid with at least one monoalcohol, which may include halogen atoms and/or ether oxygen atoms in its molecules; and glycols, polyglycols, and the ethers and esters of glycols and polyglycols, i.e., molecules that conform to the general chemical formula (I):

$$R^1\text{—O—}R^2\text{—}(OR^3)_n\text{—O—}R^4 \tag{I}$$

wherein:

each of $R^1$ and $R^4$, which may be the same or different, represents one of a hydrogen moiety, a monovalent hydrocarbon, halohydrocarbon, or halocarbon moiety, and a monovalent acyl or halo-substituted acyl moiety;

each of $R^2$ and $R^3$, which may be the same or different, represents a divalent hydrocarbon, halohydrocarbon, or halocarbon moiety; n represents zero or a positive integer; and the $R^3$ moiety in any one of the n $(OR^3)$ moieties may be the same as or different from the $R^3$ moiety in any other distinct one of these $(OR^3)$ moieties.

Preferably, component (G) when present to minimize cracking of the coating is selected from molecules that conform to general formula (I) as given above, and more preferably, independently for each preference stated, the molecules selected conform to general formula (I) when:

$R^1$ represents a hydrogen atom and $R^4$ represents an alkyl moiety having a number of carbon atoms that is at least, with increasing preference in the order given, 2, 3, or 4 and independently preferably is not more than, with increasing preference in the order given, 10, 8, 6, 5, or 4;

each of $R^2$ and $R^3$ has at least 3 carbon atoms and independently preferably has not more than, with increasing preference in the order given, 10, 8, 6, 5, 4, or 3 carbon atoms;

n is not more than, with increasing preference in the order given, 4, 3, 2, or 1.

Still more preferably, component (G) when present to minimize cracking of coatings formed with it comprises, preferably consists essentially of, or more preferably consists of, two distinct subcomponents as follows:

subcomponent (G.1) is selected from molecules that preferably have not more than, with increasing preference in the order given, 9, 8, or 7 carbon atoms each; and subcomponent (G.2) is selected from molecules that have at least 10 carbon atoms each and independently preferably have not more than, with increasing preference in the order given, 15, 14, 13, 12, 11, or 10 carbon atoms each.

Independently, when both subcomponents (.1) and (.2) are present in a composition according to the invention, the mass of (0.1) present has a ratio to the mass of (0.2) present that is at least, with increasing preference in the order given, 1.0:1.00, 2.0:1.00, 3.0:1.00, 4.0:1.00, 5.0:1.00, 5.5:1.00, 6.0:1.00, 6.5:1.00, 7.0:1.00, or 7.5:1.00 and independently preferably is not more than, with increasing preference in the order given, 25:1.00, 20:1.00, 18:1.00, 16:1.00, 14:1.00, 12:1.00, 10:1.00, or 8.0:1.00.

Independently of all other preferences, when component (G) is present in a composition according to the invention to minimize crack formation, it preferably has the property that at least, with increasing preference in the order given, 50, 60, 70, 80, 90, 95, or 99% of the amount of component (G) present in a wet coating formed in a process according to the invention is volatilized and therefore not present in the dry coating eventually formed by the process. If the temperature at which a composition according to the invention is to be used is not known, preferably at least, with increasing preference in the order given, 50, 60, 70, 80, 90, 95, or 99% of the amount of component (G) present in a wet layer of a working composition with a thickness of 1.0 millimeter will be volatilized from said wet layer by heating the layer at 121° C. for at least 60 seconds.

Independently of all other preferences, when component (G) is present in a composition according to the invention to minimize cracking of coatings formed with the composition, preferably at least part of it is emulsified into the composition rather than dissolved in it. (The occurrence of emulsification may normally be detected by a cloudy rather than a transparent appearance of the composition when it is mixed.) In order to facilitate the optimal degree of dispersion, preferably at least, with increasing preference in the order given, 50, 60, 65, 70, 75, 80, 85, or 88% of component (G) preferably consists of solvent(s) that have a solubility in water at 25° C. that is not greater than, with increasing preference in the order given, 15, 13, 11, 9.0, 8.0, 7.5, 7.3, 7.1, 6.9, 6.7, or 6.5 grams of solvent per 100 grams of water; and independently at least, with increasing preference in the order given, 1.0, 2.0, 3.0, 4.0, 5.0, 6.0, 7.0, 8.0, 9.0, 10.0, or 11.0% of component (G) preferably consists of solvent(s) that have a solubility in water at 25° C. that is not greater than, with increasing preference in the order given, 7.0, 6.8, 6.5, 6.2, 5.9, 5.6, 5.3, or 5.1 grams of solvent per 100 grams of water.

Also independently of all other preferences, the concentration of component (G) in a working composition according to the invention in which component (G) is present preferably is at least, with increasing preference in the order given, 0.5, 1.0, 1.5, 2.0, 2.5, 3.0, 3.5, 4.0, 4.5, or 4.9% of the total working composition and independently preferably is not more than, with increasing preference in the order given, 30, 25, 20, 15, 10, 9.0, 8.0, 7.0, or 6.0% of the total working composition.

As is generally known in the art, the resistance to leaching of a chromium containing protective coating can be increased by converting part of the initially added hexavalent chromium to trivalent chromium (or, of course, by otherwise supplying trivalent chromium to the composition and correspondingly reducing the content of hexavalent chromium). In general, no trivalent chromium is needed for this purpose in a working composition according to the invention, and if not needed is preferably omitted. In some instances, however, even when no trivalent chromium is desired in the working liquid composition as applied, it is advantageous for some chromium to be converted to a trivalent form during drying of the working composition into place on the substrate surface to be treated. This result may be achieved by using a working composition that contains an organic material that is not readily effective as a reducing agent for hexavalent chromium under the conditions of concentrations and storage and/or use temperature for the working composition, but that is effective as such a reducing agent at higher temperatures, higher concentrations, or both, which are achieved during drying of the liquid coating of working composition. For this purpose, it is preferable to utilize a reducing agent that does not cause any deterioration in the protective quality of the coatings formed. (It is widely believed, although not known with certainty, that the major reaction product from most of these reducing agents is carbon dioxide that escapes as a gas from the liquid composition before the liquid composition dries.) If preferred component (G) selected from molecules conforming to general formula (I) as described above is present, no other material is normally needed for component (H). If only non-reducing solvents or none at all are otherwise present in a composition according to the invention, it is preferred for such a composition to include at least one of various alcohols, glycols, sugars, starch, and like organic materials that are suitable for this purpose, as known to those skilled in the art. For reasons considered in more detail below in connection with description of preferred drying conditions, propylene glycol has been found to be the most preferred of these latent reducing additives to a composition according to the invention to be used under normal commercial operating conditions. When propylene glycol is present in a composition according to the invention and all of the chromium present in the composition is supplied to the composition as hexavalent chromium, the mass of propylene glycol present in the composition preferably has a ratio to total mass of chromium present in the same composition that is at least, with increasing preference in the order given, 0.30:1.00, 0.50:1.00, 0.70:1.00, 0.90:1.00, 1.10:1.00, 1.30:1.00, 1.50:1.00, 1.70:1.00, 1.90:1.00, 2.10:1.00, 2.30:1.00, 2.40:1.00, 2.50:1.00, 2.60:1.00, 2.70:1.00, 2.80:1.00, or 2.86:1.00 and independently preferably is not more than, with increasing preference in the order given, 10:1.0, 8.0:1.0, 6.0:1.0, 5.0:1.0, 4.5:1.0, 4.0:1.0, 3.5:1.0, or 3.0:1.0.

Optional component (J) of solid filler is generally preferably omitted, because it tends to limit the ready extensibility of the coating formed and therefore to reduce the likelihood that this coating will remain in place during alterations of the shape of the metal substrate. However, use of a filler can substantially reduce the cost of the treatment and sometimes may be preferred for that reason. Numerous finely divided solids such as clays, colloidal silica and silicates, crushed limestone, and the like are known in the art and may be employed in such instances.

Optional colorant component (K) has no technical effect on the invention, but may be preferred in some instances for aesthetic reasons. Ordinarily, the dried coating formed will have sufficient color to be readily visible, but if exceptionally thin layers and/or exceptionally low fractions of chromium are used, a colorant may be preferred to furnish visual assurance of the presence of the coating. When a coloring is desired, numerous suitable dyes and pigments to achieve such a result are known to those skilled in the art.

A liquid surface treatment composition according to the invention may be coated onto the substrate by any effective method, such as dipping, spraying, brushing, roll coating, or using an air knife or an electrostatic coating technique, preferably after removing any grease or other soil from the surface of the substrate, to form a liquid coating over the substrate to be treated according to the invention. The coating may be formed on all surfaces of the substrate or on selected portions of the surface only, depending on the positioning of the liquid film from which the dry film is formed.

After the liquid coating has been formed and put into place on the part of the substrate intended to be covered, the non-volatile contents of the coating are dried into place on the substrate surface to be treated, preferably without any intermediate rinsing. As is generally known in the art, any particular polymer or mixture used for component (A) will ordinarily have a "minimum film forming temperature" that the coating must reach while some water still remains in it, in order to assure that a continuous film will be formed. The drying operation of a process according to this invention preferably achieves this minimum film forming temperature for component (A) of the liquid film actually being dried.

If the minimum film forming temperature is low enough, the drying may be accomplished simply by exposure to the ambient natural atmosphere at less than 100% relative humidity. For increased process speed, ordinarily in commercial practice according to the invention drying preferably is accompanied by heating, for example in an oven, with a hot forced air drier, an infrared heater, or an induction heating device to convert the liquid film into an adherent dry coating over the surface of the substrate to be protected.

Particularly when high speed air flow is used, even air temperatures well above the minimum film forming temperature may not succeed in achieving continuous, crack-free coatings, presumably because too much water evaporates before the polymer content of liquid coating reaches its minimum film forming temperature. If such a phenomenon is observed, the temperature of heating should be raised until cracking or other discontinuities in the film do not occur, or an organic solvent component should be added to the working composition to minimize cracking as described above. If there is substantially no air flow rate with respect to the liquid film, a peak metal temperature of 43° C. is sufficient to assure continuous coatings from the preferred compositions according to the invention as described herein, even if they do not contain an organic solvent component to minimize cracking, but with strongly forced air, peak metal temperatures as high as 350° C. may be needed. Under specific process conditions, a suitable drying temperature that assures achieving at least the minimum film forming temperature for the acrylate polymer component in a liquid film composition according to the invention, along with otherwise satisfactory results, can be determined by minimal experimentation. A suitable drying temperature will depend on such factors as: whether heat is supplied by radiation, by transfer from a heat transfer fluid such as air, or by other methods or combinations of methods; the direction with respect to the liquid coating from which heat is primarily supplied; and the relative velocity between the liquid coating and the heat transfer fluids if any are used.

In addition to the effect of drying temperature on whether a crack free coating is formed from a particular composition according to the invention, it has been found that the peak substrate metal temperature reached during drying of a liquid coating to convert it into a solid coating according to this invention is a critical factor in the stabilization of the chromium content of the dried composition against leaching during later contact of the solid coating with water. To minimize leaching, a peak metal temperature of at least 65° C. is preferred over any lower temperature, and under many conditions of drying with some compositions according to the invention even substantially higher temperatures than this are required to minimize leaching. However, a high peak metal temperature requires a large energy input in the drying process. This requires a substantial cost for energy to supply the large energy input required. Furthermore, in some instances the necessary energy input to achieve such a high peak metal temperature may not be available from the equipment in place where a process according to the invention is desired. Still further, high peak metal temperatures may result in deterioration of other corrosion protective qualities of the coatings formed, even though chromium leaching is reduced. To achieve an optimum balance among these various factors, under practical conditions where a chromium leaching rate of up to 10%, during either 24 hours of exposure to water at 18–22° C. or 30 seconds of exposure to water at 49° C., is acceptable for articles that have been coated according to the invention and then allowed to age for at least 5 days between coating and leach testing, the peak metal temperature achieved during drying preferably is at least, with increasing preference in the order given, 43, 48, 53, 58, 63, 68, 73, 78, 83, 88, 93, 98, 103, 108, 113, 117, or 121° C. and independently preferably is not more than, with increasing preference in the order given, 205, 195, 185, 175, 165, 155, 145, 135, 130, or 125° C. (Two suitable methods for determining peak metal temperatures are described as part of the examples below.)

Unless the metal substrate has a substantial chromium content, the amount of coating formed per unit area of the substrate coated may conveniently be determined by measuring only the chromium content of the coating formed by means of an X-ray emission spectrometer, the total solids content of the coating may then be calculated from the known ratio of the chromium content to the total mass of the coating. When the dried film contains about 1% of chromium, measured as the element as is normally preferred, the mass of chromium per unit area of the substrate coated preferably is at least, with increasing preference in the order given, 1.0, 3.0, 5.0, 7.0, 8.0, 9.0, 9.5, 10.0, 10.5, 11.0, 11.4, or 11.7 milligrams per square meter (hereinafter usually abbreviated as "mg/m$^2$") and independently preferably is not more than, with increasing preference in the order given, 100, 50, 40, 30, 25, 20, 17, 14, or 12 mg/m$^2$. If the fraction of chromium in the coating differs widely from 1%, these values should be adjusted correspondingly to result in approximately the same total film masses per unit area.

The coefficient of sliding friction of a sliding contactor of stainless steel against a surface treated according to the invention preferably is not more than, with increasing preference in the order given, 0.270, 0.265, 0.260, 0.255, 0.250, 0.245, 0.240, 0.235, or 0.230. If the coefficient of sliding friction is more than 0.270, fairly frequent cracking and/or flaking of the protective coating applied is likely to result during forming operations that result in corners with a radius of curvature of 1 millimeter or less, and such corners are not particularly unusual in the forming operations to which materials treated according to this invention are subjected. The probability of any such undesirable cracking and/or flaking during forming operations in normal commercial practice has been found to decrease as the coeffcient of sliding friction decreases from 0.270, and when it was 0.230, thousands of meters of substrate have been processed without a single observation of cracking or flaking of the protective coating during forming operations that form sharp corners.

Still lower coefficients of sliding friction than 0.230 do not cause any technical disadvantage during a forming operation, but may be disadvantageous later because coiled sheets with such a low coefficient of sliding friction can more readily slip spontaneously under the influence of natural gravity from their desired cylindrical shape into a partly conical shape that makes their mechanical handling more problematical. For this reason, independently, the coefficient of sliding friction produced in a process according to this invention preferably is at least, with increasing preference in the order given, 0.020, 0.050, 0.080, 0.10, 0.12, 0.14, 0.16, or 0.18.

The coefficient of sliding friction of a surface may conveniently be measured on a draw bench equipped to record continuously as a function of time the force required to draw a standard weighted contactor at a constant speed across the surface. Such measurements show that a high initial force is required to cause the weighted contactor to begin to move, while a slightly fluctuating but (usually) substantially lower force is sufficient to keep the contactor moving after it has begun to do so. The average value of this latter force, divided by the force measured in the same units of the contactor against the surface across which it is being drawn, yields as a quotient the coefficient of sliding friction.

In contrast to the coefficient of sliding friction, the coefficient of static friction of a coating according to this invention may advantageously be considerably higher in value than the coefficient of sliding friction, in order to reduce the incidence and severity of the possible difficulties already noted above that can occur with a very slippery surface for the final substrates treated according to this invention. The coefficient of static friction may conveniently be measured by resting a weighted contactor near one end of an initially horizontal but inclinable plane having a surface for which the coefficient of static friction is to be determined, and then gradually increasing the inclination of the plane until the weighted contactor begins to slip. The tangent of the angle to the horizontal that the inclined plane makes when the contactor just begins to slip is the coefficient of static friction. For measurements of static friction reported hereinbelow, neoprene rubber was used as the sliding contactor, and with this material, the coefficient of static friction against a dry surface produced by a treatment according to this invention (before or without any additional coating that may be applied over the surface produced by a treatment according to the invention) preferably is at least, with increasing preference in the order given, 0.30, 0.40, 0.50, 0.60, 0.70, 0.60, 0.90, or 1.00.

The invention and its benefits may be further appreciated by consideration of the following, non-limiting, examples and comparison examples.

The following candidate sources of components (A), (B), and (C) as described above were tested. (Short identifying letters and/or numbers as noted below have been arbitrarily assigned to these sources for use in later tables.)

For Component (A):
    Latexes Commercially Supplied by Rohm & Haas:
    H2=Rhoplex™ HA-12: (45% solids, pH=3.0)
    H6=Rhoplex™ HA-16: (45.5% Total Solids, pH=3.0)
    A7=Rhoplex™ AC-73 or AC-73T (replacement for AC-73): (46.5% Total Solids, pH=9.5)
    MC=Maincote™ HG-54: (41.5% Total Solids, pH=7.5)
    MV=Rhoplex MV-23LO: (43% Total Solids, pH=8.5)
    Latexes Commercially Supplied by ZENECA Resins:
    N2=Neocryl™ A625 (45% Total Solids)
    N4=Neocryl™ A640
    Other Latexes:
    JN=Joncryl 1532 (supplied by S.C. Johnson; 51% solids acrylic-styrene copolymer with a glass transition temperature of 14° C.)
    AL=Arolon™ 870-W-51 (supplied by Reichhold)
    Mixed Latexes:
    AA=50% Rhoplex HA-12+50% Rhoplex AC-73
    AJ=50% Rhoplex HA-16+50% Rhoplex AC-73T
    AR=20% Rhoplex HA-16+80% Rhoplex AC-73T
For Component (B):
    AX=Unithox™ D-300 (commercially supplied by Petrolite Corp.; 23.5% solids dispersion in water of molecules of ethoxylated straight chain primary alcohols averaging about 50 carbon atoms each in the alcohol portion and about 50% of their mass in each of the alcohol portion and the ethoxylate portion)
    AQ=Aquaslip™ 671 (commercially supplied by Langer & Co.; 40% solids; polyethylene wax emulsion)
    ME=Michem™ Emulsion 39235 (commercially supplied by Michelman Inc.; 35% solids; pH=10; polyethylene wax emulsion. This was tested only briefly, because compositions including it were observed to provide substantially less corrosion protection than those made with most of the other wax dispersions tried. Reduced corrosion protection is believed to be associated with the presence of a nonionic surfactant in this dispersion.)
    AZ=Jonwax™ 26 (commercially supplied by Johnson Polymer Div. of S.C. Johnson & Sons, Inc.; 25% solids; pH=9.5; polyethylene wax emulsion)

For Component (C):
S1=81.0% deionized (hereinafter usually abbreviated as "DI") water+10.0% Chromic Acid+9.0% NH4OH (containing 29.7% NH$_3$)
S1A=90% water+10% chromic acid
S4=Composition 1A partially reduced (with an organic material that leaves no substantial residue in the composition) so that its chromium content is 70% Cr(VI) and 30% Cr(III)
For Combined Components (A) and at Least Part of (C):
AS=99.44% Rhoplex AC-73T+0.56% of 20% Chromic Acid Solution in H$_2$O
AM=50% AS+50% MV
For Component (E):
Fluorosurfactants (all supplied by du Pont)
Z8=Zonyl™ 8952 anionic surfactant
ZP Zonyl™ FSP anionic surfactant (35% active; ammonium salt of mixed mono- and diesterified phosphoric acid, with esterifying group structure F(CF$_2$CF$_2$)$_n$CH$_2$CH$_2$—, x=1 to about 7, average 4)
ZJ=Zonyl™ FSJ anionic surfactant (40% active, same fluorosurfactant as "ZP" with additional unfluorinated surfactant not otherwise specified.
Silicone homopolymers (all supplied by Dow Corning)
51=Dow Corning™ 51 Additive (77–82% active; water-dispersible ultra-high-molecular weight polydimethylsiloxane dispersion)
29=Dow Corning 29 Additive (77–82% active; water-dispersible ultra-high-molecular weight polydimethylsiloxane dispersion)
56=Dow Corning™ 56 Additive (77–82% active; water-dispersible ultra-high-molecular weight polydimethylsiloxane dispersion)
57=Dow Corning™ 57 Additive (77–82% active; water-dispersible ultra-high-molecular weight polydimethylsiloxane dispersion)
Polyether-modified polydimethylsiloxanes
Supplied by BYK Chemie:
B2=BYK™ 302 (at least 95% active)
B3=BYK™ 333 (at least 97% active)
B5=BYK™ 375
B6=BYK™ 306
B7-BYK™ 307
Supplied by Tego Chemie:
T1=Tego Glide™ 100
T4=Tego Glide™ 410

SPECIFIC EXAMPLE AND COMPARISON EXAMPLE GROUP 1

With Chromium Leaching Tests

Compositions, drying conditions, coating weights, and leaching results are shown in Table 1 below for coatings on test panels of commercially supplied steel coated on both sides with an alloy of 55% aluminum with the balance predominantly zinc. Unless

TABLE 1

| ID Number | Coating Composition, Parts by Volume-Material for Component: | | | Drying Conditions | | Chromium Coating, mg/m$^2$ | Percent of Chromium Leached |
|---|---|---|---|---|---|---|---|
| | (A) | (B) | (C) | Air ° C. Seconds of Exposure Time | Peak Metal Temperature Reached, ° C. | | |
| 1 | 9-AJ | 1-S1 | none | 343 | 3 | 66 | 9.0 | >50 |
| 2 | 9-AJ | 1-S1 | 1-AZ | 288 | 10 | 82 | 23 | 25 |
| 3 | 9-AJ | 1-S1 | 1-AZ | 316 | 20 | 143 | 8.9 | 20 |
| 4 | 9-AJ | 1-S1 | 1-AZ | 260 | 30 | 143 | 4.4 | 9.4 |
| 5 | 9-AJ | 1-S1 | 1-AZ | 343 | 20 | 168 | 17 | 1.2 |
| 6 | 9-AJ | 1-S1 | 1-AZ | 343 | 30 | 212 | 19 | 0.2 |
| 7 | 12-AJ | 1-S1 | 1-AZ | 399 | 3 | 99 | 13 | 10 |
| 8 | 12-AJ | 1-S1 | 1-AZ | 316 | 20 | 143 | 14 | 3.7 |
| 9 | 10-AJ | 1-S1 | 1-AZ | infrared heating | | 260 | 30 | 2.1* |
| 10 | 15-AJ | 1-S1 | 1-AZ | 260 | 35 | 149 | 8.8 | 6.7* |
| 11 | 9-AJ | 1-S1 | 1-AZ | 177 | 30 | 93 | 8.9 | 39* |
| 12 | 21-AJ | 1-S1 | 1-AZ | 177 | 30 | 93 | 7.6 | 9.0* |
| 13 | 30-AJ | 1-S1 | 1-AZ | 177 | 30 | 93 | 5.4 | 3.3* |
| 14 | 15-A6 | 1-S1 | 2-AZ | 204 | 25 | 121 | 11.5 | 32 |
| 15 | 15-AR | 1-S1 | 1-AZ | 204 | 25 | 121 | 8.8 | <1 |
| 16 | 15-HG | 1-S1 | 2-AZ | 204 | 25 | 121 | 10.2 | 1.0 |
| 17 | 15-AA | 1-S1 | 1-AZ | 204 | 25 | 121 | 12.2 | 7.0 |
| 18 | 15-A2 | 1-S1 | 2-AZ | 204 | 25 | 121 | 12.2 | 26 |
| 19 | 15-AL | 1-S1 | 2-AZ | 204 | 25 | 121 | 8.4 | 17 |
| 20[†1] | 15-AR | 1-S1 | 1-AZ | 204 | 25 | 121 | 3.3 | 3.7 |
| 21 | 15-N2 | 1-S1 | 1-AZ | 204 | 25 | 121 | 10.8 | 82 |
| 22 | 15-AR | 1-S1A | 1-AZ | 204 | 25 | 121 | 10.9 | 3.3 |
| 23 | 15-AR | 1-S4 | 2-AZ | 204 | 25 | 121 | 9.1 | 1.8 |
| 24[†2] | 15-AR | 1-S1 | 1-AZ | 204 | 25 | 121 | 9.7 | <1 |
| 25 | 15-AR | 1-S1 | 1-AZ | 399 | 7 | 121 | 11.2 | 13 |
| 26 | 18-AS | 1-S1 | 1-AX | 204 | 25 | 121 | 12.5 | <1 |
| 27 | 18-AQ | 1-S1 | 0.6-AQ | 204 | 25 | 121 | 12.2 | <1 |
| 28 | 18-AS | 1-S1 | 0.65-ME | 204 | 25 | 121 | 11.4 | 11.4** |
| 29[†3] | 18-AS | 1-S1 | 2-AZ | 204 | 25 | 121 | 9.8 | 4.2** |
| 30[†4] | 18-AS | 1-S1 | 0.5-ME | 204 | 25 | 121 | 10.0 | <1** |
| 31[†5] | 18-AS | 1-S1 | 0.5-ME | 204 | 25 | 121 | 10.6 | <1** |
| 32 | 19-MV | 1.2-S1 | 0.5-AZ | 204 | 25 | 121 | 11.2 | <1** |

TABLE 1-continued

| ID Number | Coating Composition, Parts by Volume-Material for Component: | | | Drying Conditions | | | Chromium Coating, mg/m² | Percent of Chromium Leached |
|---|---|---|---|---|---|---|---|---|
| | (A) | (B) | (C) | Air ° C. | Seconds of Exposure Time | Peak Metal Temperature Reached, ° C. | | |
| 33†6 | 18-AS | 1.0-S1 | 1.0-AZ | 204 | 25 | 121 | 6.6 | 15** |
| 34 | 18-AM | 1.1-S1 | 1.0-AX | 204 | 25 | 121 | 9.9 | 5.8** |
| 35†6 | 18-AS | 1.0-S1 | 1.0-AZ | 204 | 25 | 121 | 9.8 | <1** |
| 36 | 21-N4 | 1.0-S1 | 1.0-AX | 204 | 25 | 121 | 8.5 | 13** |
| 37†6 | 21-N4 | 1.0-S1 | 1.0-AX | 204 | 25 | 121 | 11.3 | 5.8** |

Footnotes for Table 1
*The tests that produce these results are run less than three days after the substrates had been coated.
**These tests are for leaching by immersion for 24 hours in water at 18–22° C.
†1This composition also contains sugar.
†2This composition also contains methanol.
†3This composition also contains 0.1 part of propylene glycol.
†4This composition also contains 0.05 part of propylene glycol.
†5This composition also contains 0.3 part of propylene glycol.
†6This composition also contains 1.0 part of propylene glycol.

otherwise specified, for all entries in Table 1: drying is in a convection oven with natural air as the heat transfer fluid; the dried samples are allowed to age for at least four days between drying and leach testing; the leaching test is for 15 seconds under rapidly running municipal water at 26 to 32° C.; the amount of chromium is measured before and after leaching by a Port-aspec™ X-ray emission spectrometer; and the times of exposure during drying that are shown are only approximate, because the termination of exposure is determined by the time required to reach the peak metal temperature specified. The peak metal temperature was measured with the aid of temperature sensitive paper manufactured by the Paper Thermometer Co., Greenfield, N.H. This temperature sensitive paper undergoes an irreversible blackening when its temperature exceeds a value specified on the paper itself or a package containing it. In most instances, one or more small squares of temperature sensitive paper with a particular indicator temperature were attached directly to a sample of the substrate material that had been coated with a composition to be tested, and several such samples were exposed for different intervals in a particular oven at a particular temperature, until conditions for attaining at least the desired peak metal temperature were determined; at least one sample to be measured for leaching is then exposed to the conditions so determined, usually without any temperature sensitive paper on the substrate on which actual leaching is measured. Alternatively, one or more squares of temperature sensitive paper are placed directly on the same substrate on which the leaching value is later measured, on either a coated or an uncoated portion of the substrate sample, so that the blackening of the temperature sensitive paper can be observed either during its actual drying or afterward. The use of temperature sensitive paper accordingly measures directly only a minimum peak metal temperature, but by advance testing as described above, or by the use of temperature sensitive paper squares with different indicator temperatures on a single coated substrate, it is possible reasonably to assure that the actual peak metal temperature is not further above the minimum than the intervals between temperature sensitive papers with different indicator temperatures, about 6° C.

SPECIFIC EXAMPLE AND COMPARISON EXAMPLE GROUP 2

With Coating Continuity Tests

In this group, only drying conditions were varied. The composition coated contained 58% of Rhoplex™ AC-73T, 4.4% of "S1" partially neutralized chromic acid solution as defined above, and 11% of "AZ" wax dispersion as defined above, with the balance being water. This liquid composition was coated onto test substrates as for Group 1, but the substrates were coated on only one side and placed immediately after coating on a laboratory hot plate set to a known temperature, with the wet coated side up and exposed to the natural atmosphere. The peak metal temperature in these experiments was determined with the use of temperature sensitive paper generally as described above, either by advance experiments with the hot plate or by squares of the temperature sensitive paper directly on the substrate tested. In some instances, no supplemental air flow other than that produced by convection was used, while in others a stream of forced air was directed along the surface as it dried. The dried coatings were examined visually to determine whether they were hazy or transparent and the coatings were further examined microscopically to determine the presence or absence of cracks. Results are shown in Table 2 below. These results indicated that the minimum film forming temperature of the polymer in the latex used is between 28 and 38° C., consistent with the report of the manufacturer of the latex that the minimum film forming temperature is 35° C. However, even with a contact heater far above that temperature, the coating can be made discontinuous by too high an air flow over its outer surface during drying.

TABLE 2

| ID Number | Cr, mg/m² | Hot Plate, ° C. | Augmented Air? | Hazy or Clear? | Cracked? |
|---|---|---|---|---|---|
| 1 | 33 | 28 | No | Hazy | Yes |
| 2 | 13 | 25 | Yes | Hazy | Yes |
| 3 | 19 | 38 | No | Clear | Partly |
| 4 | 19 | 38 | No | Hazy | Yes |
| 5 | 17 | 38 | Yes | Hazy | Yes |
| 6 | 18 | 43 | No | Clear | No |
| 7 | 16 | 71 | No | Clear | No |
| 8 | 23 | 71 | Yes | Hazy | Yes |

SPECIFIC EXAMPLE 3

With an Organic Solvent Added to Minimize Cracking

A precursor solvent and wetting promoting surfactant component for this Example was made by mixing 881 parts of DOWANOL™ PnB, a commercial product of Dow Chemical that is reported by its supplier to be predominantly the mono-n-butyl ether of propylene glycol, 116 parts of DOWANOL™ DpnB, a commercial product of Dow Chemical that is reported by its supplier to be predominantly the mono-n-butyl ether of "dipropylene glycol" (i.e., HO—$C_3H_6$—O—$C_3H_6$—O—$C_4H_9$), and 3 parts of FLUO-RAD™ FC 129, a commercial product of 3M that is reported by its supplier to be a 49.5 to 53.45% solution in 2-butoxyethanol of potassium salts of fluorine-substituted carboxylic acids having from 4 to 8 carbon atoms per molecule, with about 42% of the product being such molecules with 8 carbon atoms per molecule.

A precursor concentrate for components (A) and (B) was prepared by adding to 834 parts of "A7" latex, with vigorous stirring, first 5 parts of a 20% solution of $CrO_3$ in deionized water and then 161 parts of "AZ" wax dispersion. A separate precursor concentrate for component (C) was prepared by adding to 810 parts of deionized water, with vigorous stirring, first 100 parts of solid $CrO_3$ and then 90 parts of 29.9% solution of ammonia in water.

The final working composition for this example was then prepared by adding to 74 parts of the precursor concentrate for components (A) and (B), with vigorous stirring, the following materials in the order shown: 0.2 parts of FOAM-BAN™ MS-30 antifoam agent, a commercial product of Ultra Additives, Inc., Paterson, N.J., that is reported by its supplier to consist of polyoxyalkylene polymers, ethoxylated aromatic compounds, and organosiloxane polymers, with further compositional information proprietary; 166 parts of deionized water; 50 parts of the precursor solvent and wetting promoting surfactant component described in the second preceding paragraph above; and 40 parts of the precursor concentrate for component (C) described in the paragraph next above. This working composition is applied to galvanized steel coils and dried thereon at a temperature of about 121° C. in a high speed commercial treating facility to provide a crack-free corrosion-protective coating over the galvanized surface.

SPECIFIC EXAMPLE GROUP 4

With Blocking Evaluations

A stock solution without any of component (E) was made with the following contents: 61% of Joncryl™ 1532; 16% of Jonwax™ 26; 0.65% of $CrO_3$; 0.58% of concentrated ammonium hydroxide; water as the balance. To this stock solution was added 1% of each of the anti-blocking agents shown in Table 4. The resulting composition was coated with a drawdown bar to a uniform thickness on Galvalume™ substrates and baked for 23 seconds at 232° C. to achieve a peak metal temperature of 121° C. This produced a coating with 11–22 milligrams of chromium per square meter of coated surface. Two such panels with the same coating were then sprayed with deionized water, clamped face-to-face, and exposed to air at 100% relative humidity and 38° C. for 20 hours. The clamped panels were then cooled and separated with observation of blocking by both sound characteristic of stick-slip behavior and any other evidence of physical sticking or transfer of coating. Results are shown in Table 3 below.

TABLE 3

| | Evidence of Blocking | |
|---|---|---|
| Additive | Sticking | Sound |
| T1 | Light | None |
| T4 | Light | Little or none |

TABLE 3-continued

| | Evidence of Blocking | |
|---|---|---|
| Additive | Sticking | Sound |
| B6 | Light | Little or none |
| B3 | None | None |
| B5 | Light | Little or none |
| 29 | None | None |
| 56 | None | None |
| 57 | Substantial | Substantial |
| Z8 | Light | Little or none |
| ZJ | None | None |
| ZP (1.2 % instead of 1.0) | None | None |
| B2 | None | None |
| B7 | None | None |
| B3 | Slight | None |

Example single package concentrates according to the invention with anti-blocking additives included are shown in Table 4. The balance not shown to 100% in each concentrate in Table 4 is deionized water.

TABLE 4

| Ingredient | | % of Ingredient in Concentrate Number: | | | | | |
|---|---|---|---|---|---|---|---|
| Name | % Active | 4.1 | 4.2 | 4.3 | 4.4 | 4.5 | 4.6 |
| Joncryl ™ 1532 | 51 | 61 | 61 | 61 | 61 | 61 | 61 |
| Jonwax ™ 26 | 25 | 16 | 16 | 16 | 16 | 16 | 16 |
| $CrO_3$ | 100 | 0.65 | 0.65 | 0.65 | 0.65 | 0.65 | 0.65 |
| Aqueous ammonia | 28 | 0.59 | 0.59 | 0.59 | 0.59 | 0.59 | 0.59 |
| Zonyl ™ FSP surfactant | 35 | 0.25 | none | none | none | none | none |
| BYK ™ 302 surfactant | 97 | none | 0.10 | 0.25 | 0.50 | none | none |
| BYK ™ 333 surfactant | 97 | none | none | none | none | 0.10 | none |
| Dow Corning ™ 51 silicone dispersion | 20 | none | none | none | none | none | 0.50 |

What is claimed is:

1. A process for treating a metal surface to reduce the coefficient of sliding friction thereon, said process comprising operations of:

(I) forming over said metal surface a coating of a liquid composition that before, during, or both before and during drying reacts with said metal surface to produce a modified solid surface with a lower coefficient of sliding friction than said metal surface; and (II) drying said coating of liquid composition into place on said metal surface over which it was formed in operation (I), without intermediate rinsing, wherein the liquid composition comprises water and the following components:

(A) dissolved, dispersed, or both dissolved and dispersed organic film-forming resin;

(B) dissolved, dispersed, or both dissolved and dispersed wax that is not part of immediately previously recited component (A);

(C) dissolved, dispersed, or both dissolved and dispersed hexavalent chromium;

(D) dissolved, dispersed, or both dissolved and dispersed pH adjusting agent that is not part of any one of immediately previously recited components (A) through (C); and (E) at least one member selected from the group consisting of surfactants and organic solvents which are not part of the component (A) or (B); said liquid composition having a pH of at least 6.5.

2. The process according to claim 1, wherein the mass of wax component (B) in said liquid composition has a ratio to the mass of resin component (A) in said liquid composition, both of these masses being on a dry basis, that is at least about 0.02:1.0.

3. The process according to claim 2, wherein the mass of the stoichiometric equivalent as $CrO_3$ of the hexavalent chromium present in said liquid composition has a ratio to the mass, on a dry basis, of the resin component (A) in said liquid composition that is at least about 0.0010:1.0.

4. The process according to claim 3, wherein resin component (A) comprises at least one polymer selector from the group consisting of polymers comprising residues of at least one monomer selected from the group consisting of acrylic acid, methacrylic acid, maleic acid, esters of acrylic acid, esters of methacrylic acid, esters of maleic acid, acrylonitrile, methacrylonitrile, acrylamide, methacrylamide and mixtures thereof.

5. The process according to claim 4, wherein wax component (B) is a polyethylene wax with a melting point in a range from about 85 to about 150° C.

6. The process according to claim 5, wherein:
the ratio of the mass of wax component (B) to the mass of resin component (A), both on a dry basis, is from about 0.090:1.00 to about 0.15:1.0;
the ratio of the mass of the stoichiometric equivalent as $CrO_3$ of the content of hexavalent chromium to the mass, on a dry basis, of resin component (A) is from about 0.0140:1.00 to about 0.030:1.00; and
during operation (II), the metal substrate reaches a temperature of at least about 88° C.

7. The process according to claim 1 wherein the surfactant comprises at least one member selected from the group consisting of anionic fluorinated surfactants, nonionic surfactants, silicone surfactants, ethoxylated silicone surfactants and mixtures thereof.

8. The process according to claim 1 wherein the organic solvent comprises at least one member selected from the group consisting of esters with a structure that can be made by completely esterifying orthophosphoric acid with at least one monoalcohol with can include halogen atoms, ether oxygen atoms and combinations thereof, esters with a structure which can be made by completely esterifying sulfuric acid with at least one monoalcohol which can include halogen atoms, ether oxygen atoms and combinations thereof and compositions of the formula $R^1$—O—$R^2$—$(OR^3)_n$—O—$R^4$ wherein each $R^1$ and $R^4$ may be the same or different and independently represent hydrogen, a monovalent hydrocarbon group, a halohydrocarbon group, a halocarbon group, a monovalent acyl group and a halo substituted acyl group; each of $R^2$ and $R^3$ may be the same or different and independently represent a divalent hydrocarbon group, a divalent halohydrocarbon group, a divalent halocarbon group; n represents zero or a positive integer; and wherein the $R^3$ group in any of the $(OR^3)_n$ groups may be the same or different form the $R^3$ group in any other distinct one of the $(OR^3)$ groups.

9. A process for treating a metal surface to reduce the coefficient of sliding friction thereon which comprises:
(I) forming over said metal surface a coating of a liquid composition that before, during, or both before and during drying reacts with said metal surface to produce a modified solid surface with a lower coefficient of sliding friction than said metal surface; and
(II) drying said coating of liquid composition into place on said metal surface over which it was formed in operation (I), without intermediate rinsing, wherein the liquid composition has been made by mixing with a first mass of water at least the following additional masses:
(A) a second mass of organic film-forming resin that is spontaneously water soluble, dissolved in water, dispersed in water, or any two or more of spontaneously water soluble, dissolved in water, and dispersed in water;
(B) a third mass of wax that is not part of said second mass and that is water soluble, dissolved in water, dispersed in water, or any two or more of spontaneously water soluble, dissolved in water, and dispersed in water; and
(C) a fourth mass of a source of hexavalent chromium that is spontaneously water soluble, dissolved in water, dispersed in water, or any two or more of spontaneously water soluble, dissolved in water, and dispersed in water, said liquid composition having a pH of between 7 and 11.

10. The process according to claim 9, wherein said third mass has a ratio to said second mass that is at least about 0.04:1.0.

11. The process according to claim 10, wherein the mass of the stoichiometric equivalent as $CrO_3$, of the hexavalent chromium in said fourth mass, has a ratio to the mass, on a dry basis, of the resin component (A) in said liquid composition that is at least about 0.0050:1.0.

12. The process according to claim 11, wherein the resin in said second mass comprises at least one polymer selected from the group consisting of polymers comprising residues of at least one monomer selected from the group consisting of acrylic acid, methacrylic acid, maleic acid, esters of acrylic acid, esters of methacrylic acid, esters of maleic acid, acrylonitrile, methacrylonitrile, acrylamide, and methacrylamide.

13. The process according to claim 12, wherein the wax in said third mass is a polyethylene wax with a melting point in a range from about 85 to about 150° C.

14. The process according to claim 13, wherein:
the ratio of said third mass to said second mass, on a dry basis, is from about 0.075:1.00 to about 0.25:1.0;
the ratio of the mass of the stoichiometric equivalent as $CrO_3$ of the content of hexavalent chromium in said fourth mass to said second mass, on a dry basis, is from about 0.0110:1.00 to about 0.050:1.00; and
during operation (II), the metal substrate reaches a temperature of at least about 88° C.

15. The process according to claim 1, wherein the dried coating formed in operation (II) contains at least 5 mg/m² of chromium.

16. The process according to claim 15, wherein the dried coating formed in operation (II) has a coefficient of sliding friction against stainless steel that is not more than 0.250.

17. The process according to claim 1, wherein the dried coating formed in operation (II) has a coefficient of sliding friction against stainless steel that is not more than 0.250.

18. The process according to claim 9, wherein the metal substrate surface coated is an alloy of aluminum and zinc.

19. The process according to claim 1, wherein the metal substrate surface coated is an alloy of aluminum and zinc.

20. The process according to claim 15, wherein the metal substrate surface coated is an alloy of aluminum and zinc.

21. The process according to claim 1, wherein said liquid composition further comprises a concentration of from about 1.0 to about 10% of the total working composition of an organic solvent component selected from the group consisting of:

esters with a structure that can be made by completely esterifying othophosphoric acid with at least one monoalcohol which can include halogen atoms, ethers oxygen atoms and combinations thereof, esters with a structure which can be made by completely esterifying sulfuric acid with at least one monoalcohol which can include halogen atoms, ether oxygen atoms and combinations thereof and compositions of the formula $R^1$—O—$R^2$—$(OR^3)_n$—O—$R^4$ wherein each $R^1$ and $R^4$ may be the same or different and independently represent hydrogen, a monovalent hydrocarbon group, a halohydrocarbon group, a halocarbon group, a monovalent acyl group and a halo substituted acyl group;

each of $R^2$ and $R^3$ may be the same or different and independently represent a divalent hydrocarbon group, a halohydrocarbon group, a halocarbon group; n represents zero or a positive integer; and wherein the $R^3$ group in any of the $(OR^3)_n$ groups may be the same or different from the $R^3$ group in any other distinct one of the $(OR^3)$ groups.

22. The liquid composition of matter useful as a treatment composition in the process according to claim 6, said liquid composition comprising water and the following components:

(A) a mass of dissolved, dispersed, or both dissolved and dispersed organic film-forming resin;

(B) a mass of dissolved, dispersed, or both dissolved and dispersed wax that is not part of immediately previously recited component (A);

(C) a mass of dissolved, dispersed, or both dissolved and dispersed hexavalent chromium;

wherein:
a ratio of the mass of wax component (B) to the mass of resin component (A), both on a dry basis, is from about 0.090:1.00 to about 0.15:1.0; and
a ratio of the mass of the stoichiometric equivalent as $CrO_3$ of the mass of hexavalent chromium to the mass, on a dry basis, of resin component (A) is from about 0.0140:1.00 to about 0.030:1.00.

23. The liquid composition of matter useful as a treatment composition in the process according to claim 14, said liquid composition having been made by mixing with a first mass of water at least the following additional masses:

(A) a second mass of organic film-forming resin that is spontaneously water soluble, dissolved in water, dispersed in water, or any two or more of spontaneously water soluble, dissolved in water, and dispersed in water;

(B) a third mass of wax that is not part of said second mass and that is spontaneously water soluble, dissolved in water, dispersed in water, or any two or more of spontaneously water soluble, dissolved in water, and dispersed in water; and (C) a fourth mass of a source of hexavalent chromium that is spontaneously water soluble, dissolved in water, dispersed in water, or any two or more of spontaneously water soluble, dissolved in water, and dispersed in water, wherein:
the ratio of said third mass to said second mass, both on a dry basis is from about 0.090:1.00 to about 0.15:1.0;
the ratio of the mass of the stoichiometric equivalent as $CrO_3$ of the content of hexavalent chromium in said fourth mass to said second mass, on a dry basis, is from about 0.0140:1.00 to about 0.030:1.00.

24. A process for treating a metal surface to reduce the coefficient of sliding friction thereon, said process comprising operations of:

(I) forming over said metal surface a coating of a liquid composition that before, during, or both before and during drying reacts with said metal surface to produce a modified solid surface with a lower coefficient of sliding friction than said metal surface; and (II) drying said coating of liquid composition into place on said metal surface over which it was formed in operation (I), without intermediate rinsing, wherein the liquid composition comprises water and the following components:

(A) dissolved, dispersed, or both dissolved and dispersed organic film-forming resin;

(B) dissolved, dispersed, or both dissolved and dispersed wax that is not part of immediately previously recited component (A);

(C) dissolved, dispersed, or both dissolved and dispersed hexavalent chromium; and (D) at least one surfactant not part of the component (A) or (B) selected from the group consisting of anionic surfactants, silicone surfactants, ethoxylated silicone surfactants and mixtures thereof in an amount effective to reduce blocking.

* * * * *

UNITED STATES PATENT AND TRADEMARK OFFICE
CERTIFICATE OF CORRECTION

PATENT NO. : 6,899,770 B1
DATED : May 31, 2005
INVENTOR(S) : Goodreau et al.

It is certified that error appears in the above-identified patent and that said Letters Patent is hereby corrected as shown below:

Column 21,
Line 14, delete "selector" and insert -- selected --.
Line 41, delete "with" and insert -- which --.
Line 56, delete "form" and insert -- from --.

Signed and Sealed this

Eleventh Day of April, 2006

JON W. DUDAS
*Director of the United States Patent and Trademark Office*